United States Patent [19]

Maack

[11] Patent Number: 5,317,924

[45] Date of Patent: Jun. 7, 1994

[54] SELF-RETAINING, SELF-SEALING PRESSURE SENSOR

[75] Inventor: Steven R. Maack, Kokomo, Ind.

[73] Assignee: Delco Electronics Corporation

[21] Appl. No.: 912,379

[22] Filed: Jul. 13, 1992

[51] Int. Cl.⁵ .............................................. G01L 7/00
[52] U.S. Cl. ...................................... 73/756; 220/691
[58] Field of Search ......................... 73/756; 277/178; 220/691

[56] References Cited

U.S. PATENT DOCUMENTS

| | | | |
|---|---|---|---|
| 2,546,672 | 3/1951 | Le Clair | 184/105 |
| 3,012,699 | 12/1961 | Denman | 222/341 |
| 3,438,397 | 5/1969 | Gilpin | 73/756 |
| 3,580,988 | 5/1971 | Orlowski et al. | 277/178 |
| 3,621,952 | 11/1971 | Long et al. | 277/178 |
| 4,180,297 | 12/1979 | Abrams | 312/214 |
| 4,274,545 | 6/1981 | Peroni | 220/691 |
| 4,682,707 | 7/1987 | Wiles | 220/307 |
| 4,683,757 | 8/1987 | Adams et al. | 73/756 |
| 4,693,112 | 9/1987 | Ferris | 73/756 |
| 4,942,383 | 7/1990 | Lam et al. | 338/42 |
| 5,029,879 | 7/1991 | Strang, Sr. et al. | |

FOREIGN PATENT DOCUMENTS 2123904 2/1984 United Kingdom ................ 227/178

Primary Examiner—Richard E. Chilcot, Jr.
Assistant Examiner—William L. Oen
Attorney, Agent, or Firm—Mark A. Navarre; Patrick M. Griffin

[57] ABSTRACT

A self-retaining, self-sealing manifold pressure sensor includes a sensor body with depending stem and an enlarged lower foot on the stem. The stem is tightly surrounded by a sealing and retention boot, which has a lower flange located just above the stem foot, which is larger than the stem foot. The stem foot is smaller than the installation hole in the manifold wall, while the boot flange is larger, but flexible. The sensor is installed by inserting the probe and surrounding boot together through the hole, with the flange flexing as it passes through. After installation, the flange is trapped between the stem foot and the wall, which prevents expulsion due to positive pressure spikes.

2 Claims, 3 Drawing Sheets

SELF-RETAINING, SELF-SEALING PRESSURE SENSOR

This invention relates to pressure sensors in general, and specifically to a pressure sensor assembly which may be easily installed, and which is self-sealing and self-retaining.

BACKGROUND OF THE INVENTION

As part of a continuing effort to fine tune vehicle engine performance, more and more engine conditions are continually monitored. One of these is manifold pressure, which is generally negative, or below ambient, but which is subject to rapid positive fluctuations, as in the case of an engine back fire. Any pressure sensor must pass through an opening in the manifold wall, which must be sealed. In addition, it must be securely mounted to the manifold wall. Typically, the sealing and installation functions are separate and independent. The sensor probe that is inserted into the manifold wall is surrounded by a sealing sleeve, while the body of the sensor is retained to the manifold wall by separate fasteners, such as screws. While this arrangement works well, there would be a cost advantage in eliminating installation steps and parts.

SUMMARY OF THE INVENTION

The invention provides a sensor assembly that combines the sealing and installation functions into one.

In the preferred embodiment disclosed, the manifold wall contains a cylindrical installation hole and the sensor consists of a sensor body with a depending cylindrical stem long enough to extend through the installation hole. The outside diameter of the stem is significantly smaller than the installation hole, except for an enlarged circular foot formed at the bottom of the stem. The stem foot is still small enough to fit through the installation hole with clearance, however.

The other component of the assembly is a combined retention and sealing boot molded from a resilient, flexible material, in a generally cylindrical, sleeve shape. The center of the boot is a cylindrical passage with a diameter substantially equal to the outside diameter of the stem. The outer surface of the boot includes a series of axially spaced flexible fins, each substantially equal to the diameter of the installation hole. At the bottom of the boot is an enlarged circular flange, which is larger in diameter than the installation hole.

Installation is a simple, two-step process. The sensor body stem is first inserted through the boot central passage, which expands to allow the larger stem foot to pass completely through it. Then, the sensor body and boot are inserted together through the wall installation hole. The boot's lower flange bends back, popping out on the lower side of the hole, trapped between the wall and the stem foot. In operation, the stem is tightly sealed to the boot central passage, and the boot ribs are tightly sealed to the installation hole, so no pressure is lost. Should a rapid pressure rise occur, the trapped flange prevents the assembly from being blown out.

DESCRIPTION OF THE PREFERRED EMBODIMENT

These and other objects and features of the invention will appear from the following written description, and from the drawings, in which.

Figure 1:
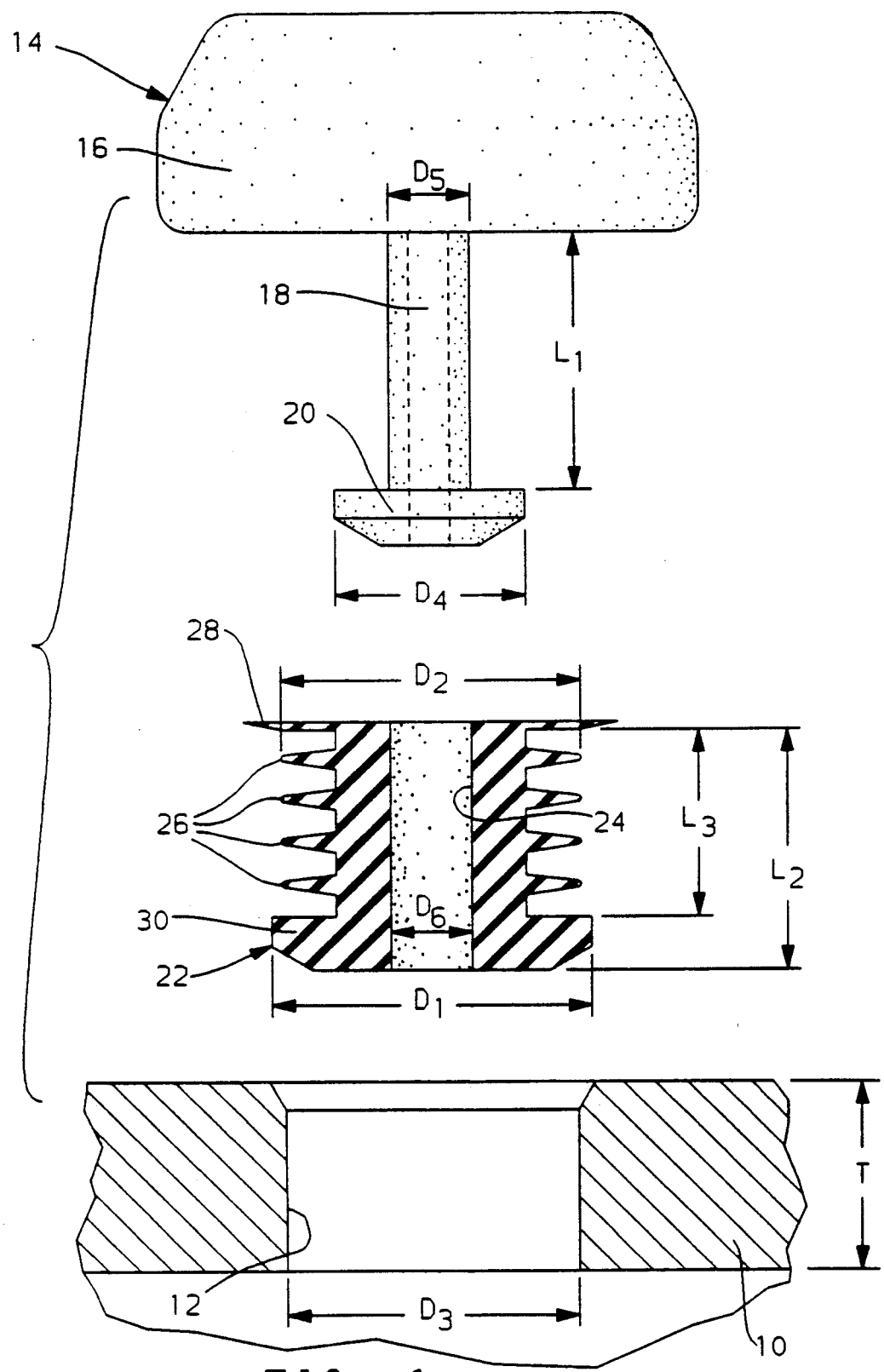
FIG. 1 is an exploded view of a cross section through a manifold wall installation hole, a cross section of the retention and sealing boot of the invention, and the sensor body.

Referring first to FIG. 1, a manifold is represented by a section of manifold wall (10), which has a thickness T. The pressure above wall (10) is simply the ambient pressure, while the pressure below is manifold pressure. As noted above, manifold pressure may vary from the usual negative to infrequent, but high, positive spikes, as caused by an engine backfire. A cylindrical installation hole (12) drilled through wall (10) has a length equal to T, a fixed diameter $D_3$, and a chamfered upper edge. A sensor body, indicated generally at (14), includes a large housing (16), which contains the actual sensor mechanism, and a depending cylindrical stem (18) that is long enough to extend through hole (12) and which is ported to take pressure to housing (16). The diameter of stem (18), indicated at $D_5$, is considerably less than $D_3$, but an enlarged circular foot (20) formed integrally at the bottom of stem (18) has a diameter $D_4$ that is in between, larger than $D_5$, but still smaller than $D_3$. Foot (20) also has a chamfered lower edge. The length between the top of foot (20) and the underside of housing (16) is indicated at $L_1$, and is substantially greater than T.

Still referring to FIG. 1, a combined retention and sealing boot, indicated generally at (22), is generally sleeve shaped, molded from a resilient, flexible material, such as a fluoro silicon polymer, which is also durable and heat resistant. A central cylindrical passage (24) has a diameter $D_6$ which is close to, or very slightly less than, $D_5$, and a total length $L_2$ substantially equal to $L_1$. The outside of boot (22) comprises a series of four identical, axially spaced circular fins (26), each of which has an edge diameter $D_2$ that is substantially equal to, or just slightly greater than, $D_3$. A larger top fin (28), in the embodiment disclosed, is significantly larger than $D_3$. At the bottom of boot (22) is an enlarged flange (30), thicker than the fins (26), and with a diameter $D_1$ larger than $D_3$. Like foot (20), flange (30) has a chamfered lower edge. The inside length $L_3$ from the top of flange (30) to the top fin (28), is substantially equal to T.

Figure 2:
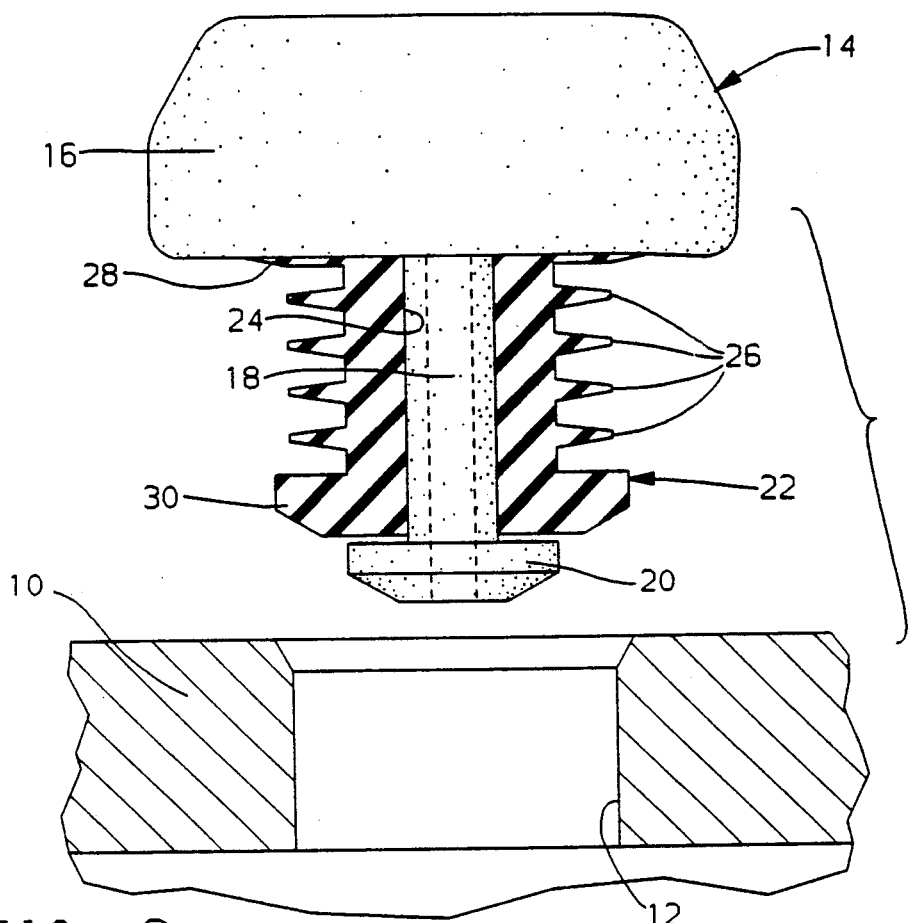
FIG. 2 shows the boot installed to the sensor body.
Figure 3:
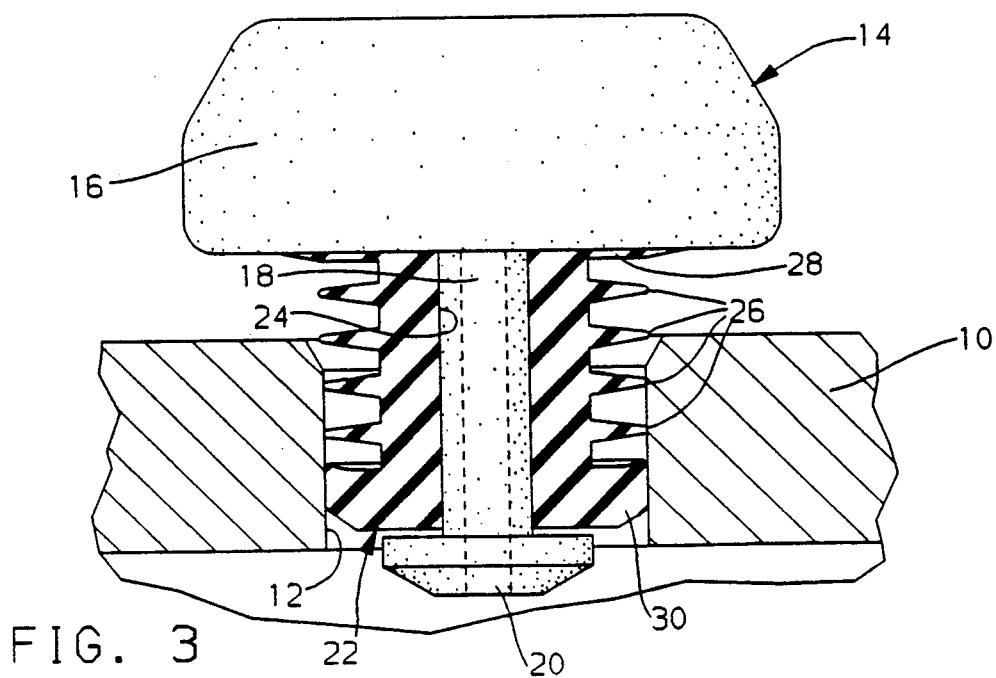
FIG. 3 shows the subassembly of boot and sensor body being installed to the manifold wall.
Figure 4:
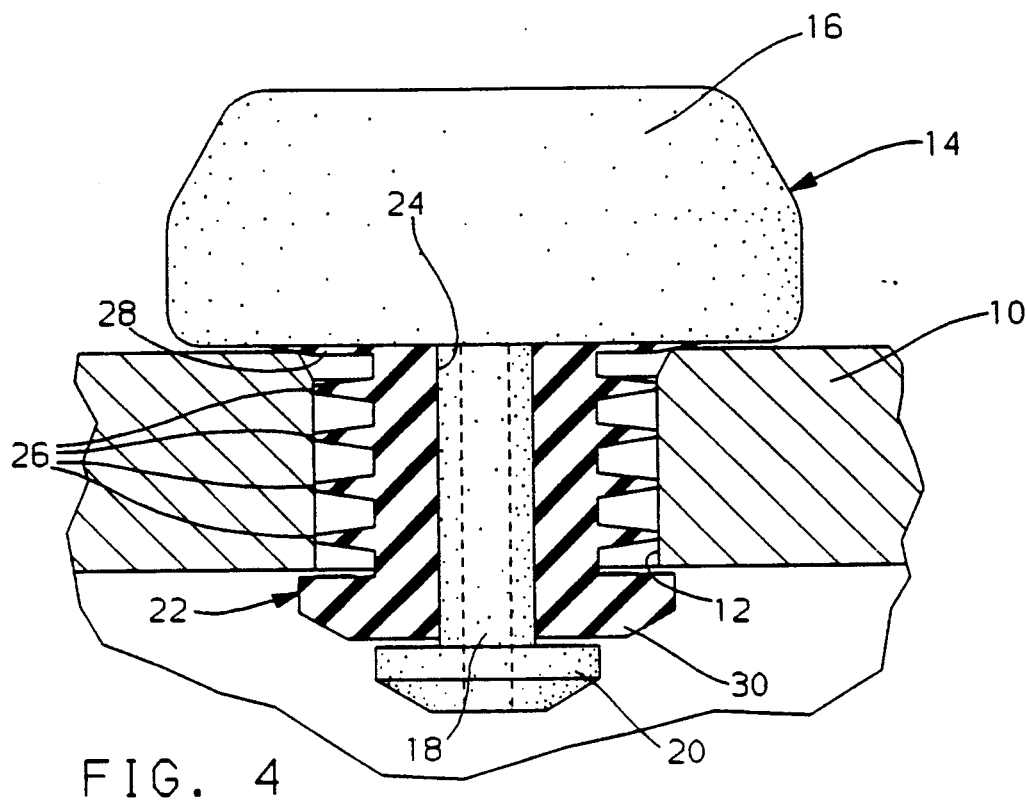
FIG. 4 shows installation completed.

Referring next to FIGS. 2 through 4, the operation and interaction of the various dimensions described above lead to a simplified installation process. First, the sensor body (14) is assembled to the boot (22) by inserting stem (18) through central passage (24). This is possible because of the resilience and elasticity of the material from which boot (22) is molded, which will expand to allow foot (20) to pass through, and is aided somewhat by the chamfered lower edge of foot (20). The central boot passage (24) retracts to seal tightly against the outer surface of stem (18). When complete, as shown in FIG. 2, a subassembly of the two is created, and boot (22) is securely trapped between foot (20) and sensor body (14), given the relationship between $L_1$ and $L_2$. Next, as shown in FIG. 3, the subassembly is inserted into installation hole (12), aided by the chamfered edges of hole (12) and boot flange (30). Flange (30), being larger in diameter, is compressed somewhat, and flexes axially up as it passes through hole (12). Foot (20), of course, clears hole (12) completely. The fins (26)

are also flexed axially up slightly, but pass through with much less resistance than flange (30). Finally, as shown in FIG. 4, flange (30) pops out below wall (10).

Referring next to FIG. 4, the normal operation after installation is illustrated. Pressure can enter housing (16) through the ported stem (18), but leakage is prevented. There is no leak path between stem (18) and boot central passage (24), because of the relation between $D_5$ and $D_6$. Likewise, there is no leak path between the outside of boot (22) and hole (12), because of the relation between $D_2$ and $D_3$. In normal operation, retention is not a problem. Sensor body housing (16) is much larger than hole (12), and the manifold pressure below wall (10) is generally negative, tending to pull both housing (16) and boot (22) down, as is illustrated by the axial clearances between the underside of wall (10), boot flange (30), and stem foot (20). The larger top fin (28) does help to cushion sensor housing (16) from direct abutment with the upper side of wall (10).

Figure 5:
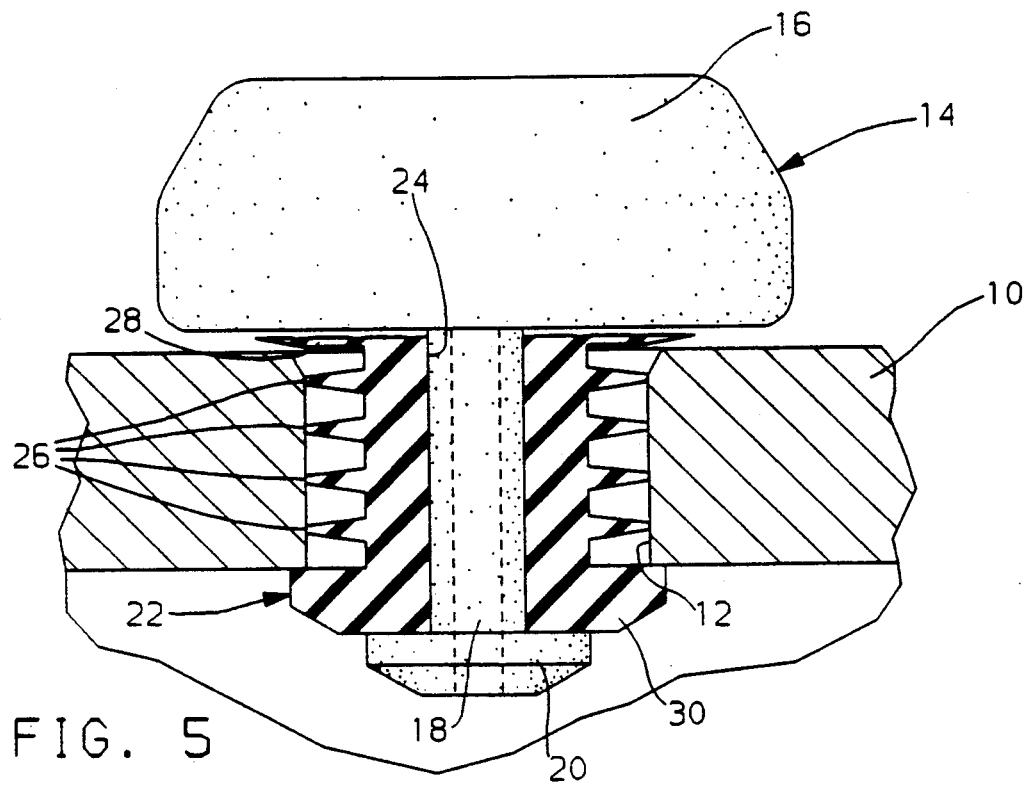
FIG. 5 shows the response to a rapid pressure rise in the manifold.

Referring next to FIG. 5, the operation of the invention in response to a high positive manifold pressure is illustrated. As noted above, high positive pressure, as from an engine backfire, would tend to expel boot (22) and sensor body (14). However, the trapping of flange (30) between foot (20) and the underside of wall (10) prevents expulsion. Flange (30) does not flex down to allow it to exit hole (12) as easily as it flexed up to enter hole (12). This selective inflexibility is partially because the upper surface of flange (30), which is abutted with the underside of wall (10) around hole (12), is not chamfered. Even more so, it is due to the cooperative support that flange (30) receives from the abutted upper surface of stem foot (20), which is pushed into it by the positive pressure. Therefore, flange (30) will not be expelled through hole (12) nearly so easily as it was inserted in the first place. Furthermore, the squeezing of flange (30) between the upper side of foot (20) and the under side of wall (10), illustrated by the removal of the axial clearances of FIG. 4, serves as an extra seal, aiding the sealing of the fins (26) and blocking off the boot central passage (24) even more strongly. So, not only is expulsion prevented, but extra sealing is provided in response to any positive pressure spike.

Variations in the preferred embodiment could be made. Theoretically, the outer surface of the boot (22) could be simply cylindrical and smooth, without the fins (26), so long as its outer diameter was similar. However, the fins (26) make installation easier, because of their axial flexibility, and because of the axial clearance they leave relative to the lower boot flange (30) to improve its axial flexibility during insertion. Boot (22) could, in theory, be molded or otherwise integrally formed around the pressure sensor stem (18), starting out in the condition shown in FIG. 2, and eliminating the installation step of inserting foot (20) through central passage (24). Therefore, it will be understood that it is not intended to limit the invention to just the embodiment disclosed.

The embodiments of the invention in which an exclusive property or privilege is claimed are defined as follows:

1. A self-retaining, self-sealing pressure sensor assembly for installation through a fixed diameter installation hole in a wall that separates an enclosed pressure from ambient pressure and which is subject to significant, rapid fluctuations above ambient pressure that tend to expel said sensor assembly, comprising:
   a sensor body including a depending stem having an enlarged lower foot that is smaller in size that the diameter of said installation hole, and
   a retention and sealing boot of resilient, flexible sealing material surrounding said sensor body stem having a sealing surface with a diameter substantially equal to said installation hole, and an enlarged lower flange with a diameter larger than said installation hole,
   whereby, said sensor body and sealing boot may be installed by simultaneous insertion through said installation hole as said enlarged lower flange flexes to pass through said installation hole, after which said stem and installation hole are both sealed against pressure loss by sealing engagement with said boot, and said sensor body is retained against expulsion by said enlarged lower flange being trapped between said sensor body enlarged foot and an interior surface of said wall which is subject to said enclosed pressure.

2. A self-retaining, self-sealing pressure sensor assembly for installation through a fixed diameter installation hole in a wall that separates an enclosed pressure from ambient pressure and which is subject to significant, rapid fluctuations above ambient pressure that tend to expel said sensor assembly, comprising:
   a sensor body including a depending stem having a generally cylindrical outer surface and an enlarged lower foot that is smaller in size than the diameter of said installation hole, and
   a retention and sealing boot of resilient, flexible sealing material including a generally cylindrical central passage with a diameter substantially equal to said stem outer surface, a sealing surface with a diameter substantially equal to said installation hole, and an enlarged lower flange with a diameter larger than said installation hole,
   whereby, said sealing boot may be first installed to said sensor body by inserting said stem and enlarged lower foot through said central passage, which expands and retracts into tight fitting sealing engagement around said stem as said enlarged foot passes through, after which said sensor body and boot may be installed by simultaneous insertion through said installation hole as said enlarged lower flange flexes to pass through said installation hole, after which said stem and installation hole are both sealed against pressure loss by sealing engagement with said boot, and said sensor body is retained against expulsion by said enlarged lower flange being trapped between said sensor body enlarged foot and an interior surface of said wall which is subject to said enclosed pressure.

* * * * *